J. C. CLIME.
Turbine Water-Wheels.
No. 214,813. Patented April 29, 1879.
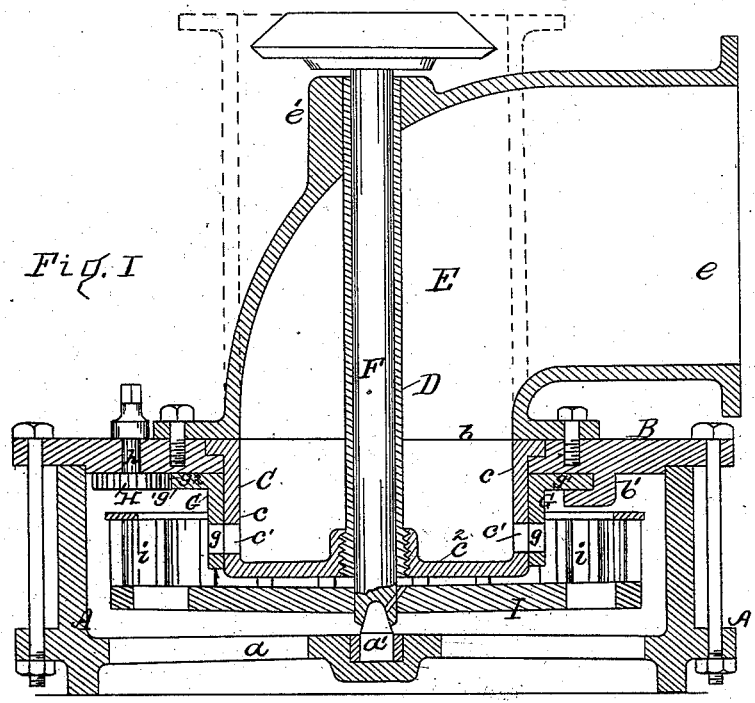
Fig. I
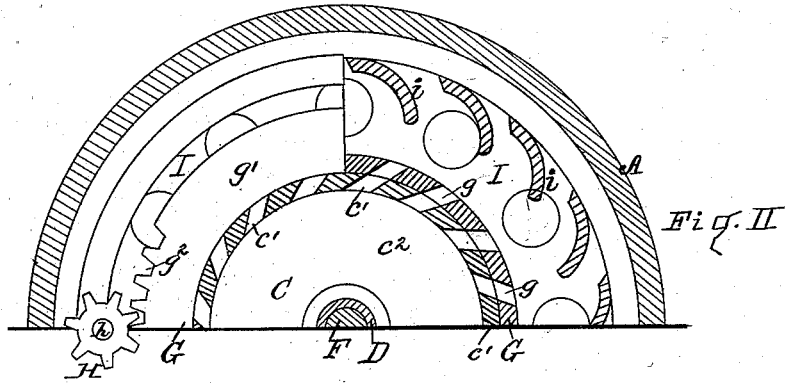
Fig. II
WITNESSES:
Harry White
E. Furgerson
INVENTOR.
John C. Clime

UNITED STATES PATENT OFFICE.

JOHN C. CLIME, OF PHILADELPHIA, PENNSYLVANIA, ASSIGNOR OF ONE-THIRD HIS RIGHT TO GEORGE F. GODLEY AND ONE-THIRD TO FREDERICK WEIHEMNAYER, OF SAME PLACE.

IMPROVEMENT IN TURBINE WATER-WHEELS.

Specification forming part of Letters Patent No. 214,813, dated April 29, 1879; application filed March 14, 1879.

*To all whom it may concern:*

Be it known that I, JOHN C. CLIME, of Philadelphia, in the county of Philadelphia and State of Pennsylvania, have invented certain new and useful Improvements in Turbine Water-Wheels; and I do hereby declare the following to be a full, clear, and exact description of the invention, such as will enable others skilled in the art to which it pertains to make and use it, reference being had to the accompanying drawings, which form part of this specification, in which—

Figure 1 is a transverse vertical section of my improvements. Fig. 2 is a horizontal section of one-half of the wheel-case and chute-box, the wheel and gate being shown partly in plan and section.

My invention has for its object to provide a new and improved turbine water-wheel, which is an improvement on that already patented by me, and which is simple in construction and efficient in operation; and to this end it consists, first, in the provision of a wheel-case having a removable top or cover, on the under side of which is a central annular chamber, in the walls or sides of which are a series of chutes, from which the water escapes to the wheel; second, in the provision of a pen-stock, centrally located above the wheel-case, and connected thereto, so as to register with the annular chamber in the cover of the wheel-case, said pen-stock being formed with a bearing for the wheel-shaft, which passes therethrough; third, in the provision of an annular gate surrounding the chute-chamber, and which is provided with a flange, by means of which said gate is suspended in brackets from the top of the wheel-case, said flange being furnished with a rack, which meshes with a gear-wheel having its bearing directly in the top of the wheel-case, so that by the manipulation of the gear the gate is adjusted to cause its openings to register with or vary from those of the chutes; fourth, in the provision of a tube or pipe arising from the bottom of the chute-chamber in the wheel-case top and projecting upwardly, and secured in a bearing in the pen-stock; fifth, in the provision of the general combination, construction, and arrangement of parts hereinafter more fully described.

Referring to the accompanying drawings, A represents the wheel-case, made with a skeleton bottom, $a$, having a central step-bearing, $a'$. B is the top or cover of the wheel-case. Said top has a central opening, $b$, and a depending annular chamber or box, C, the sides $c\ c$ of which are provided with a series of chutes, $c^1\ c^1$. E is the pen-stock, made elbow-shaped, as shown in full lines of Fig. 1, to be so used when the wheel is placed at a distance from the fall or supply of water, the latter being conducted to and flowing into the branch $e$ of said pen-stock. The latter is directly over the aperture $b$, and has its sides flush with those of the chamber C, thus providing means for bringing the water to the center of the wheel-case.

From the bottom $c^2$ of the chamber C proceeds a fixed tube, D, which passes upwardly, and is secured in the bearing $e'$ of the pen-stock.

The object of pipe D is as follows: The form of pen-stock shown in full lines, Fig. 1, being used, water entering therein fills the same, and, rising to the bearing $e'$, would flow out at this point if the pipe D were not used. It being securely fastened both in the bottom $c^2$ and at the bearing $e'$, a water-tight pen-stock and chute-chamber is produced, while ample provision is made for the shaft F to find its bearings in said pipe D. Where a straight pen-stock, as shown in dotted lines, Fig. 1, is employed, the necessity for using the pipe D ceases, and it is dispensed with. The wheel-shaft then has its bearings directly in the pen-stock and bottom $c^2$.

G is the gate surrounding the chute-chamber C, and is provided with openings $g\ g$ and a flange, $g^1$, by means of which said gate is loosely suspended in the brackets $b'\ b'$ on the top B, so as to freely turn therein. Said flange is formed with a rack, $g^2$, in which meshes a gear-wheel, H, secured to the shaft $h$, having its bearing directly in the cover B.

I is the wheel formed with the curved buckets $i\ i$, and is secured to the shaft F, having a bearing in the step $a'$.

The operation is plainly seen. The water enters the pen-stock and passes into the chamber C, thence through the chutes and gate, striking the buckets of the wheel, and, imparting its impact thereto, passes off and out through the bottom of the case.

The advantages of the foregoing-described construction are its simplicity of construction and novel arrangement of the parts thereof as to require the minimum of fitting the parts together, thus greatly reducing the first cost of the wheel. The water entering the case from the top of the same allows it to be set in position without making any special preparations therefor.

What I claim as my invention is—

1. In a turbine water-wheel, the case A, having a removable top, B, provided with a central depending chamber, in the walls of which are formed the chutes, substantially as shown and described.

2. The wheel-case A, having removable top B, provided with depending chute-chamber C, in combination with pen-stock E, for conducting the water to the center of the wheel-case, substantially as shown.

3. The combination of case A, removable top B, chute-chamber C, and gate G, substantially as shown and described.

4. The combination of case A, removable top B, chute-chamber C, gate G, and wheel I, substantially as shown and described.

5. The combination of case A and removable cap B, the latter being provided with brackets for supporting the gate, so as to rotate freely therein, substantially as shown and described.

6. In a water-wheel case, a removable cap provided with a depending chute-chamber, gate, and gear mechanism for manipulating said gate, substantially as shown and described.

In testimony that I claim the foregoing I have hereunto set my hand this 11th day of March, 1879.

JOHN C. CLIME.

Witnesses:
H. T. WOOD,
CHAS. A. SMITH.